US012563253B2

(12) United States Patent
Apurvi

(10) Patent No.: US 12,563,253 B2
(45) Date of Patent: Feb. 24, 2026

(54) METHOD OF BROADCASTING REAL-TIME ON-LINE COMPETITIONS AND APPARATUS THEREFOR

(71) Applicant: Gathani Apurvi, Adalaj (IN)

(72) Inventor: Gathani Apurvi, Adalaj (IN)

( * ) Notice: Subject to any disclaimer, the term of this patent is extended or adjusted under 35 U.S.C. 154(b) by 0 days.

(21) Appl. No.: 17/833,534

(22) Filed: Jun. 6, 2022

(65) Prior Publication Data

US 2023/0396826 A1 Dec. 7, 2023

(51) Int. Cl.
| | |
|---|---|
| *H04N 21/2668* | (2011.01) |
| *H04N 21/2187* | (2011.01) |
| *H04N 21/242* | (2011.01) |
| *H04N 21/475* | (2011.01) |

(52) U.S. Cl.
CPC ..... *H04N 21/2668* (2013.01); *H04N 21/2187* (2013.01); *H04N 21/242* (2013.01); *H04N 21/4758* (2013.01)

(58) Field of Classification Search
CPC .......... H04N 21/2668; H04N 21/2187; H04N 21/242; H04N 21/4758
USPC .......................................................... 725/9
See application file for complete search history.

(56) References Cited

U.S. PATENT DOCUMENTS

| | | | |
|---|---|---|---|
| 7,477,282 B2 | 1/2009 | Firestone et al. ............. 709/204 |
| 9,787,945 B2 | 10/2017 | Segal et al. |
| 11,102,253 B2 | 8/2021 | Dröse et al. .................. 709/232 |
| 2012/0060101 A1 | 3/2012 | Vonog et al. ................. 715/751 |
| 2012/0224024 A1* | 9/2012 | Lueth .................... H04L 65/765 |
| | | | 348/E13.001 |

| | | | |
|---|---|---|---|
| 2013/0162755 A1 | 6/2013 | Swanson et al. .......... 348/14.08 |
| 2016/0149836 A1* | 5/2016 | Narayanan .............. H04L 67/01 |
| | | | 709/206 |
| 2017/0142170 A1* | 5/2017 | Sylvain ............... G06F 16/9558 |
| 2018/0255114 A1 | 9/2018 | Dharmaji |
| 2018/0338119 A1 | 11/2018 | Hoffman |
| 2019/0020905 A1* | 1/2019 | Bennett .................. H04N 5/917 |
| 2019/0099653 A1* | 4/2019 | Wanke ................... G06Q 50/01 |

(Continued)

FOREIGN PATENT DOCUMENTS

| | | |
|---|---|---|
| CN | 103873889 A | 6/2014 |
| CN | 104253814 A | 12/2014 |

(Continued)

OTHER PUBLICATIONS

Chelsey Parrott-Sheffer, Great Dionysia ancient Greek festival, 2020, https://www.britannica.com/topic/Great-Dionysia last modified Mar. 29, 2020, 1 page. (Year: 2020).*

*Primary Examiner* — Alfonso Castro

(74) *Attorney, Agent, or Firm* — Kevin J Fournier Intellectual Property Legal Services Ltd.; Kevin J Fournier

(57) ABSTRACT

A live streaming method lets organizers broadcast real-time online competitions or events over the internet with high-speed streaming and real-time voting, and with layered audio on top of the webRTC channel. It is completely developed on Real-time Communication and considers organizers, hosts, participants, and audience members. An interactive event experience strategically synchronizes multiple live events happening at one or more places. With the app, only the broadcaster/host/organizer would have the authority to start an event and would have all the controls. The host can invite multiple participants to join the live broadcast, and this sets the client role in WebRTC as a participant.

17 Claims, 14 Drawing Sheets

(56)　　　　　　References Cited

U.S. PATENT DOCUMENTS

| | | |
|---|---|---|
| 2020/0021892 A1 | 1/2020 | April et al. |
| 2020/0177659 A1 | 6/2020 | Åström et al. |
| 2021/0168484 A1 | 6/2021 | Jiang et al. |
| 2022/0070504 A1 * | 3/2022 | Hartnett ........... H04N 21/21805 |
| 2022/0408157 A1 * | 12/2022 | Siddique ................. H04N 7/15 |

FOREIGN PATENT DOCUMENTS

| | | |
|---|---|---|
| CN | ON 104683884 A | 6/2015 |
| CN | 111386708 A | 7/2020 |
| IN | 201821005659 A | 2/2018 |

* cited by examiner

300

MeLive

Add a Title

Enter a channel name

Add Event Discription

Let people know what your live event will be about.

Live Control Room

Save Event

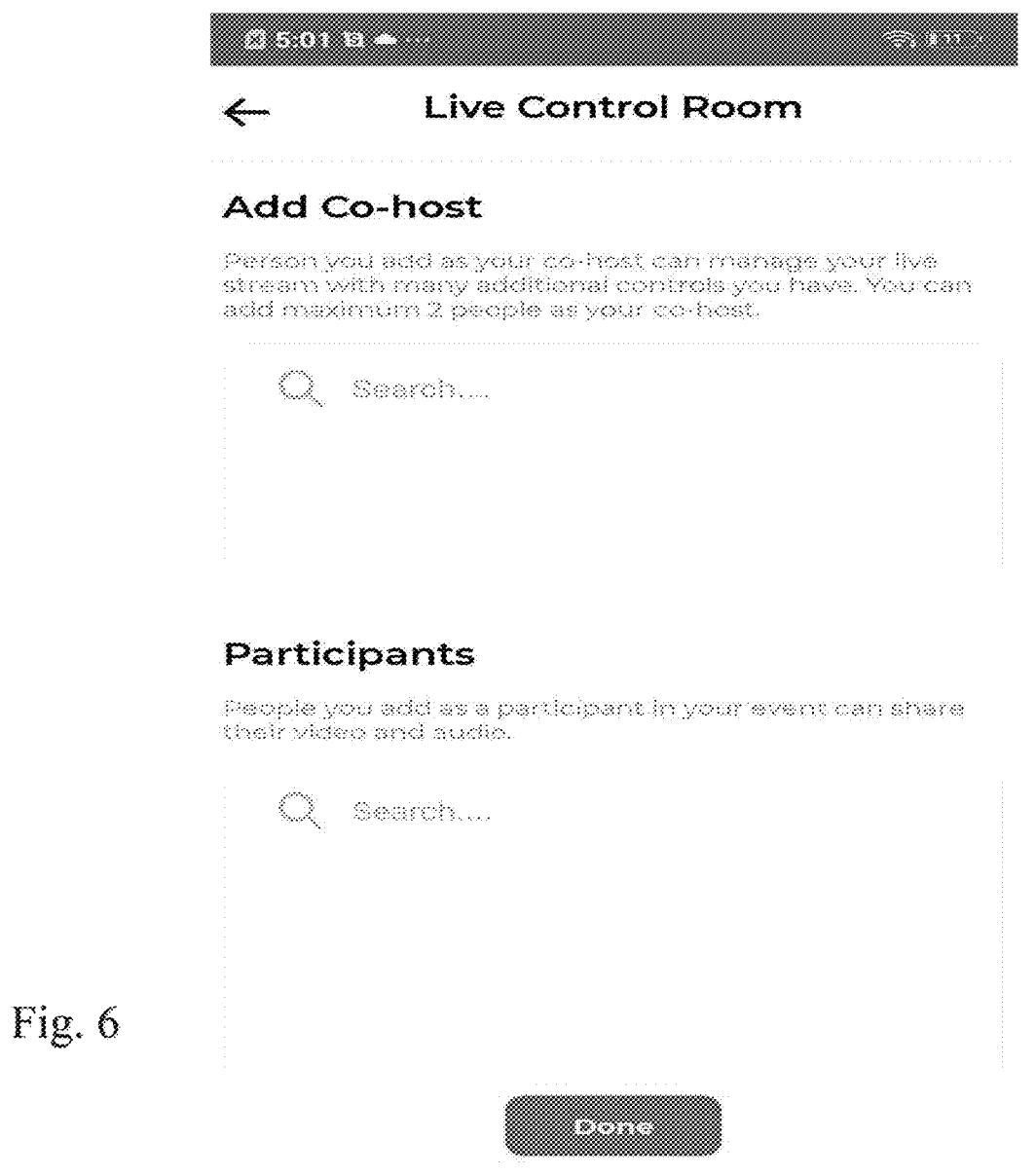

Live Control Room

←

Add Co-host

Person you add as your co-host can manage your live stream. With many additional controls you have. You can add maximum 3 people as your co-host.

Q  Search.....

Participants

People you add as a participant in your event can share their video and audio.

Q  Search.....

Done

Fig. 6

METHOD OF BROADCASTING REAL-TIME ON-LINE COMPETITIONS AND APPARATUS THEREFOR

BACKGROUND OF THE INVENTION

1. Field of the Invention

An objective of the present invention is to provide features to let organizers broadcast real-time online competitions with high-speed streaming where is no or very little interruption while transmitting audio and video, Another objective of the present invention is to provide a real-time live streaming service layered with audio and real-time voting.

2. Description of the Related Art

To date, no platform has been developed yet to provide a smooth high-speed live streaming experience with layered audio. Companies that enable users to host real-time streaming are not equipped with all of the tools and criteria needed to conduct a real-time live event like real-time voting layered with audio.

Real-time event hosting is a pain point for many applications as technology has not yet been developed to do high-speed live streaming with synched audio. Audio is an important aspect of hosting such events. When there is a competition going on and it is live, and there is no recording, a significant feature is to have less disturbance in video quality.

SUMMARY OF THE INVENTION

An aspect of the present invention is to provide hosting and live voting, and creating an event with live hosting and live voting, where the host creates an event runs the event can come on the screen while hosting and can go "backstage" (be taken off the display) while the performances are conducted.

Another aspect of the present invention is to provide a feature to let organizers broadcast real-time online competitions with high-speed streaming.

Another aspect of the present invention is to provide a real-time live streaming service layered with audio and real-time voting.

Another aspect of the present invention is to host real-time competitions between users and to provide the users with a platform to showcase their talent.

Another aspect of the present invention is to entertain users across the world and send their insights and feedback using real-time comments and emoticons.

Another aspect of the present invention is to provide an opportunity to up and coming content creators to showcase their talent in the comfort of their homes or at any desired location.

Another aspect of the present invention is to provide family-friendly content for all age groups for safe and healthy consumption of content. Another aspect of the present invention is to provide smooth interoperability.

Another aspect of the present invention is to provide an accurate and synchronized experience for the audience.

Another aspect of the present invention is to provide a real-time live streaming platform with a user-friendly User Interface (UI) and one that provides an easy-to-use user experience.

Another aspect of the present invention is to provide a real-time live streaming platform that requires low internet consumption so that even people with spotty internet connections and capabilities can be entertained. Consequently; a real-time live streaming platform is provided that is easily accessible to everyone.

Another aspect of the present invention is to provide a real-time live streaming feature with low consumption of memory to give a smoother and more natural and pleasing user experience.

According to an aspect of the present invention, a method of allowing a host to broadcast an on-line event, comprises:

enabling the host to provide an invitation to potential participants to participate in the event;

enabling the potential participants to accept the invitation to be participants;

accepting audience members to sign up for the event.

controlling, by the host, access by the participants to be viewed by the audience members;

enabling voting in real-time by the audience members from among the participants; and controlling, by the host, access by the participants to be viewed by the audience members;

enabling voting in real-time by the audience members from among the participants.

According to an aspect of the present invention, a system for enabling a host to broadcast an on-line event; comprises;

a server comprising:

a memory configured to store computer-executable instruction for executing the solutions in this application; and a processor controlling the execution of the computer-controlled executable instructions and configured to;

enable a host to provide an invitation to potential participants to participate in the event;

enable the potential participants to accept the invitation to be participants; accept audience members to sign up for the event;

control, by the host, access by the participants to be viewed by the audience members; and enable voting in real-time by the audience members from among the participants Additional aspects and/or advantages of the invention will be set forth in part in the description which follows and; in part; will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is an interface of the LiveControlRoom that is shown in the screenshot of FIG. 5.

DETAILED DESCRIPTION OF THE EMBODIMENTS

Figure 1:
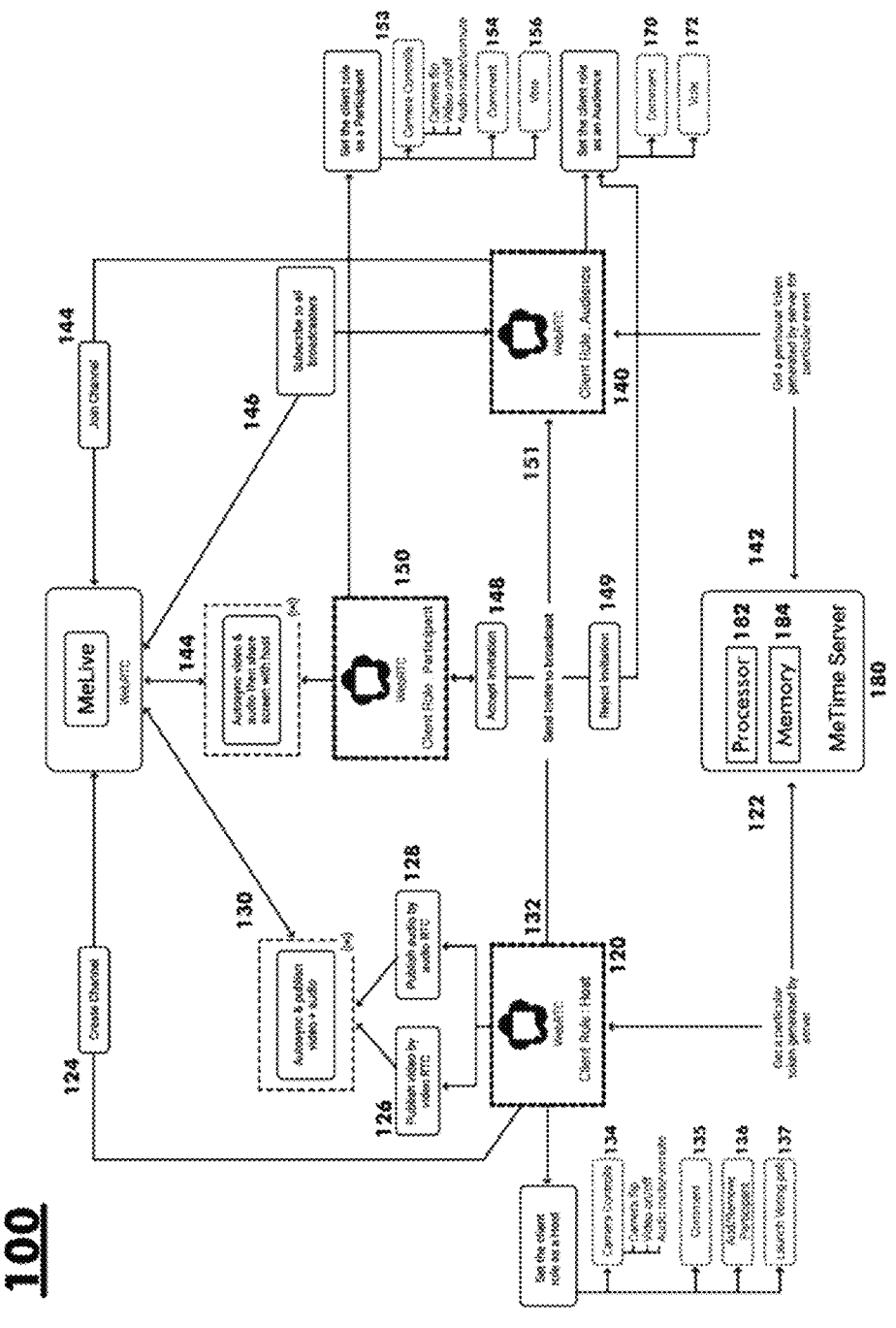
FIG. 1 is a diagram showing a process of connectivity between a host; audience members and participants according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The app (currently named MeLive by the inventor, but of course can change in the future) lets organizers broadcast real-time online competitions with high-speed streaming and real-time voting with layered audio on top of a webRTC channel. Here, the top of the webRTC channel refers to the channel that enables a host and participants to publish their video. The correct channel name has to be entered like a password.

This feature is a beneficial tool for building a stronger connection between the participants and their audiences, allowing them to gain valuable feedback via comments and emoticons, and insights straight from the people that matter most.

Online competitions have only been organized at a physical location until now and due to the pandemic, not only online competitions were put on hold, but also the dream of participants who were eager to participate and win such competitions.

The app is completely developed on Real-time Communication where Real-time communication is a category of software protocols and communication hardware media that give real-time guarantees, and is necessary to support the real-time guarantees of real-time computing. The app has been developed keeping in mind the best user experience one can get is if there is a live host(s), an audience and participants.

The app according to aspects of the present invention is a platform for content creation, social connections, and fan monetization. The app helps people connect with their friends and followers immediately. According to one aspect, a feature of the app is that the video will disappear as soon as the stream stops, which could encourage more users to jump on as audience members, and feel more comfortable sharing live content as participants. On the other hand, the fact that the content will no longer be viewable once the stream ends also creates a feeling of urgency for viewers to ensure that they don't miss out.

An aspect of the present invention is to provide a feature to let organizers broadcast real-time online competitions with high-speed streaming, in which the transmission of audio and video files is in a continuous flow over an Internet connection without any interruption.

Another aspect of the present invention is to provide a real-time live streaming service layered with audio and real-time voting. Layered with audio refers to in the app, before publishing live video, auto synching the audio and video. Real-time voting refers to providing the functionality of enabling users to vote for their favorite performances in real-time.

Another aspect of the present invention is to host real-time competitions between participants and to provide the participants with a platform to showcase their talent.

Another aspect of the present invention is to entertain an audience across the world and send their insights and feedback using real-time comments and emoticons.

Another aspect of the present invention is to provide an opportunity to up and coming content creators to showcase their talent in the comfort of their homes or at any desired location.

Another aspect of the present invention is to provide family-friendly content for all the age groups for safe and healthy consumption of content.

Another aspect of the present invention is to provide smooth interoperability. With the current platform, surety that the content provided as part of the competition is family-friendly can be provided, particularly by a back-end team. Moreover, the host has the power to immediately remove suspicious participants who break the rules, so that the content will be family friendly.

Another aspect of the present invention is to provide family-friendly content for all the age groups for safe and healthy consumption of content.

Another aspect of the present invention is to provide smooth interoperability.

Here, smooth interoperability refers to the ability of different products or systems to readily connect and exchange information with one another.

Another aspect of the present invention is to provide an accurate and synchronized experience for the audience. The video is published by videoRTC and audio by audioRTC and then synchronized, and only then is published for the end user. Accordingly, the audio and video will be more accurate and synchronized. Here, videoRTC stands for video Real Time Communications and audioRTC stands for audio Real Time Communications.

Another aspect of the present invention is to provide a real-time live streaming platform with a user-friendly User Interface (UI) and one that provides an easy-to-use user experience.

Another aspect of the present invention is to provide a real-time live streaming platform that only requires low internet consumption so that even people with spotty internet connections and capabilities can be entertained. Consequently, a real-time live streaming platform is provided that is easily accessible to everyone. The speed of the internet is identified by a connection manager that is a function provided in Android® and iOS® codings, and future codings. And by this, the bitrates are set.

Another aspect of the present invention is to provide hosting and live voting, and creating an event with live hosting and live voting, where the host creates an event, runs the event, can come on the screen while hosting and can go "backstage" (be taken off the display) while the performances are conducted.

Firstly, internet permission is granted when the end user connects with the app and when the end-user interacts with the app. The Internet permission is automatically given whenever the user installs the app. However, the permission of a camera and a microphone is asked when a user starts the hosting or the participating.

By using some method of inbuilt Android® and iOS® operating systems, the users, such as audience members, interact with the internet via such programs as Connection-Model, ConnectionLiveData.

Another aspect of the present invention is to provide a real-time live streaming feature with low consumption of memory to give a smoother and more natural and pleasing user experience. In the app, programs are set so that after the completion of the event, the device on which the user joins as a host, an audience member or a participant automatically ends the live performance (video) from the device so that the device consumes less memory. For providing this operation, garbage collection that is generally applied to deleting files is used so that the usage of memory is used.

There are three (3) different roles and functionalities of the users, such as a host, an audience member or a participant that have different roles and functionalities, A purpose of app is to provide the function of live performances. These performances can be any type of performance and/or entertainment, such as dancing, singing, mimicry, comedy, etc.

FIG. 1 is a diagram showing a device and process 100 of connectivity between a host, audience members and participants (a subset of the audience members).

Step-by-Step Description of the Process of a Host 120 is Given Below:

1. The first step 122 is that the host 120 gets a particular token from a server 180 for a particular channel.
2. In step 124, after getting the token from a server 180, the host 120 creates the channel which enables audience members to join.
3. In step 126, the host 120 can publish their video by using the videoRTC.
4. In step 128, the host 120 can publish their audio by using the audioRTC.
5. In step 130, autosync publishes the audio and video that is available for all users to watch.
6. In step 132, The host 120 picks potential participants before allowing and accepting audience members 140, and adds the potential participants to a control room. Then the host 120 sends an invitation request to the potential participants, and if accepted in step 148, the potential participants are added as participants 150 to the waiting room. If the potential participant rejects the invitation in the control room in step 149, the potential participant is added to the event as an audience member 140.

In step 132, after the potential participants are added as participants 150 in the control room, the host 120 sends an invitation 151 to audience members 140 to join the event. The participants are provided with their performance sequence with a tentative timeline by an earlier communication via email by the event planner or/and host. When the time comes for them to participate, the host sends another invitation request to them from the control room. See FIG. 7. The participant accepts this invitation, and he/she will be shown on the performance screen at that time.

The functions given to the host 120 are described as below:

Camera Controls 134 including
Camera Flip
Video on/off
Audio Mute/Unmute
Comment 135
Add/Remove Participant 136
Launch VotingPoll 137
Audience—Step-by-Step Description of the Process of Audience is Given Below:

1. The first step 142 for an audience member 140 is that the audience member 140 gets the particular token.
2. In step 144, the audience member 140 can join the channel that was created by the host 120.
3. In step 146, after joining in the channel, the audience member 140 is able to subscribe to the audio and video of the host 120 and the participants 150.

The participant's 150 video and audio are published to all the users by videoRTC and audioRTC.

In step 144, the participant's 150 audio and video are audio synched, and a screen is shared with the host 120.

The functions given to Participants is described as below:

Camera Controls 153
Camera Flip
Video on/off
Audio Mute/Unmute
Comment 154
Vote 156
The functions given to Audience is described as below:

Comment 170
Vote 172
MeTime Server: All users (host 120, audience member 140 and participant 150) get the token from the server 180. The whole process works around the webRTC.

A server 180 which runs the app, for example, is a computing node, a cluster of computing nodes and/or any processing device having one or more processors.

A processor 182, which may be a part of or separate from the server 180, may be implemented by at least one of electronic units such as a general-purpose central processing unit (CPU), an application-specific integrated circuit (ASIC), a digital signal processor (DSP), a programmable logic device (PLD), a field programmable gate array (FPGA), a controller, a microcontroller, and/or a microprocessor, or may be implemented by a software module that performs at least one function or operation. A software module may be implemented by using a software program compiled by using any appropriate software language. The software program may be stored in a memory in a client device, for example, a desktop computer, a laptop computer, a mobile device (e.g., a smartphone, a tablet, etc.), an HMD, stereoscopic goggles and/or the like device or a network, and is read and executed by a processor.

A memory 184 which may be a part of or separate from the server 180, may be one or more of the following types: a flash (flash) memory, a memory of a hard disk type, a memory of a micro multimedia card type, a card-type memory (for example, a secure-digital (SD) or extreme-digital (XD memory), a random access memory (RAM), a static random access memory (SRAM), a read-only memory (ROM), a compact disc read-only memory (CD-ROM), an electrically erasable programmable read-only memory (EE-PROM), a programmable read-only memory (PROM), or another compact disc storage medium, an optical disc storage medium (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer, but is not limited thereto. The memory may exist independently and is connected to the processor by using the communications bus. The memory may alternatively be integrated with the processor.

There is a host who creates a channel using an appropriate channel name, and the host's video and audio are published by video Real Time Communications (videoRTC).

First, the host will create the channel by starting the event. A particular audio is published by using audio Real Time Communication and this audio part is referred to as a music layer. The host picks potential participants before allowing and accepting audience members, and adds the potential participants to a control room. Then the host sends an invitation request to the potential participants, and if accepted, the potential participants are added as participants to the waiting room.

On the other hand, there is another client role called an audience member who can subscribe to the event by getting a particular token that was generated by the app server 120 for the particular event. Whenever the host starts the event, a token is generated by the app automatically. Any user that joins the app has access to the token. This process runs in the background so that the user does not have to do anything.

When the particular participant's turn comes to perform, the host sends another invitation request, and the participant accepts this invitation, and he/she will be shown on the performance screen.

The host sends the invitation to the participants to join the event and share their screen via the RTCEngine with the audience members. The participants share the screen with the host webRTC by auto-syncing the audio and video with webRTC and the music layer. The different roles of the app are:

1) Host
2) Audience
   Participant
   HOST Capability
   WebRTC provides the client role of host by using CLI-ENTROLE_BROADCASTER.

Then, the host gets the token from the server 120. Whenever the host starts the event, the client device automatically receives the token from the server 120.

After that, the host, through webRTC, creates a channel by a particular channel name that will be available to the entire audience, including the participants.

The next step is to publish the video of the host through the videoRTC and the music by a separate music layer, and auto sync the video and audio using different functions, such as audioRTC and videoRTC provided by the webRTC, and then publish the video and music through the webRTC. The host picks potential participants before allowing and accepting audience members, and adds the potential participants to a control room. Then the host sends an invitation request to the potential participants, and if accepted, the potential participants are added as participants to the waiting room.

Finally, the audience member scan subscribes to the host screen. As noted previously, the participants are predefined. The lapse time is less than 0.2 seconds.

The following are functions provided to the host.

1)—Flip the camera:—In this function, the host can flip his camera to face rear back to his/herself or forward.
2)—Video on/off:—In this function, the host can turn on and off his camera.
3)—Mute/unmute audio:—In this function, the host can turn on and off his audio.
4)—Voting on/off:—In this function, the host can visibly show a voting poll to the entire audience, including the participants or hide the voting poll from the audience. In this instance, firestore, which is part of firebase, implements the voting function.] and store the data.
5)—Comments:—In this function, the host can comment on the performance. For this function, webRTC Real-Time Messaging is used.
6)—Control Room:—This function enables the host to perform different actions, like adding and removing participants from the participant pool.

Audience Capability:—

First of all, webRTC provides the client role as an audience member by CLIENT_ROLE_BROAD-CASTER.

Then, the client device of the audience member gets the token automatically for the particular event.

After that, through webRTC, an audience member joins the channel that was created by the host.

Finally, the audience member can subscribe to all broad-casters, i.e., the host and the participants.

*Functions Provided to the Audience* i—Voting:—In this function, an audience member can vote for their favorite participants when the host makes the voting poll visible. For this function, firestorm is used to store the vote of the audience member.
ii—Comments:—In this function, an audience member can comment on the performance. For this function, webRTC RealTime Messaging is used.

Joining the Live Event

If invited by the host directly, a pop up would show on the potential participant's screen to join the live stream as a participant. If the potential participant accepts the invitation, he/she would join as a participant and if the invitation is declined, then the user will become an audience member.

Participant Capability

When the host sends an invitation to add potential participant as a participant through the webRTC, the potential participant either accepts or cancels the invitation. Before the start of the performance/event, the host adds potential participants to the participant list. After the start of the event, the host adds all of the members of the participant list to a waiting room, and from the waiting room, sends the join participant invitation to the participants at a particular time.

When the participant member accepts the join invitation, the participant pool member joins the event as a participant. After that, the app publishes the video of the participant through the videoRTC and the music by the separate music layer. and the video and audio that autosyncs by using the different functions and publishes the video and music through the webRTC so that the participants can share the screen with the host. The host sets the order of the partici-pants. In an example, the host invites only 2 participants at a time. Once the 2 participants complete their performances, then the 2 participants leave the live showing of the event as a participant, and the host invites another pair of participants.

When the potential participant cancels the join invitation, then he/she will not share the screen, become an audience member, and continue to subscribe to the host and the other participants of the event.

*Functions Provided to the Participants*—Flip the Camera:—

In this function, the participant can flip his camera to face rear back to his/herself or forward.

ii—Video on/off:—

In this function, the participant can turn on and off his camera.

iii—Mute/unmute Audio:—In this function, the participant can on and off his audio.

The host can shut down any participant if he finds any false or obscene language or activity.

The app provides a platform to let organizers broadcast real-time online competitions with high-speed streaming. The app provides a real time voting experience by enabling the audience to give insights and feedback and also to choose a winner amongst a group of participants by majority or other fashion.

The app is equipped to provide high speed streaming using videoRTC and audioRTC, with layered/synchronized audio on top of the webRTC channel created.

webRTC provides interfaces to the application and in coding, webRTC for real-time Communication is used.

RealTime Messaging—For comments, real time Messaging is used, enabling the audience members to give comments on the live performance. The comment messages are stored in a MeTime server and show all of the comments to every audience member who appears in this performance.

CLIENT_ROLE_BROADCASTER—is the part of the webRTC.

The app works on the platform webRTC. As mentioned above, there are 3 roles of the users, that being the host, the audience members and the participants that have different roles and functionalities. One type of event of app is to provide the function of live dancing performance. There is a host who can publish the video and audio of participants using videoRTC and the music layer. On the other hand, there is another client role called audience members, where the audience members can subscribe to the host by getting a token that was generated by the server 120 for the particular event. Moreover, the host sends the invitation via RTCEngine to potential members. The potential members who receive the invitation, can share the screen with the host webRTC by auto synching of the audio and video with webRTC and music layer or cancel the invitation and continue as an audience member.

In a Live Control Room Section (control room) of the app, there is a host, and there may also be more than one host, as well as any number of participants before creating an event. The host is provided a search function from a database of users. In addition, LiveControlRoom is controlled by the host where the host has the rights to invite the participants in the order that they join as participants.

The host is provided a unique channel name from which he/she is able to create the channel. Not anyone is able to create the channel and use the video and audio and other functionalities.

A runtime voting system is provided to audience members including the participants with an attractive user interface. The voting process is easy that so that the audience members can vote for their favorite participant(s). The audience member has to only press one button and his/her vote is applied to that participant's performance tally. The votes are stored in the database.

The voting tally is updated in real-time so as to be more interactive with all of the users.

The following are methods for the main functionalities.

—getClickOnLiveText( )—

This method is used when an audience member joins the event from the viewpagerplayvideofragment.

—animation( )—

Figure 14:
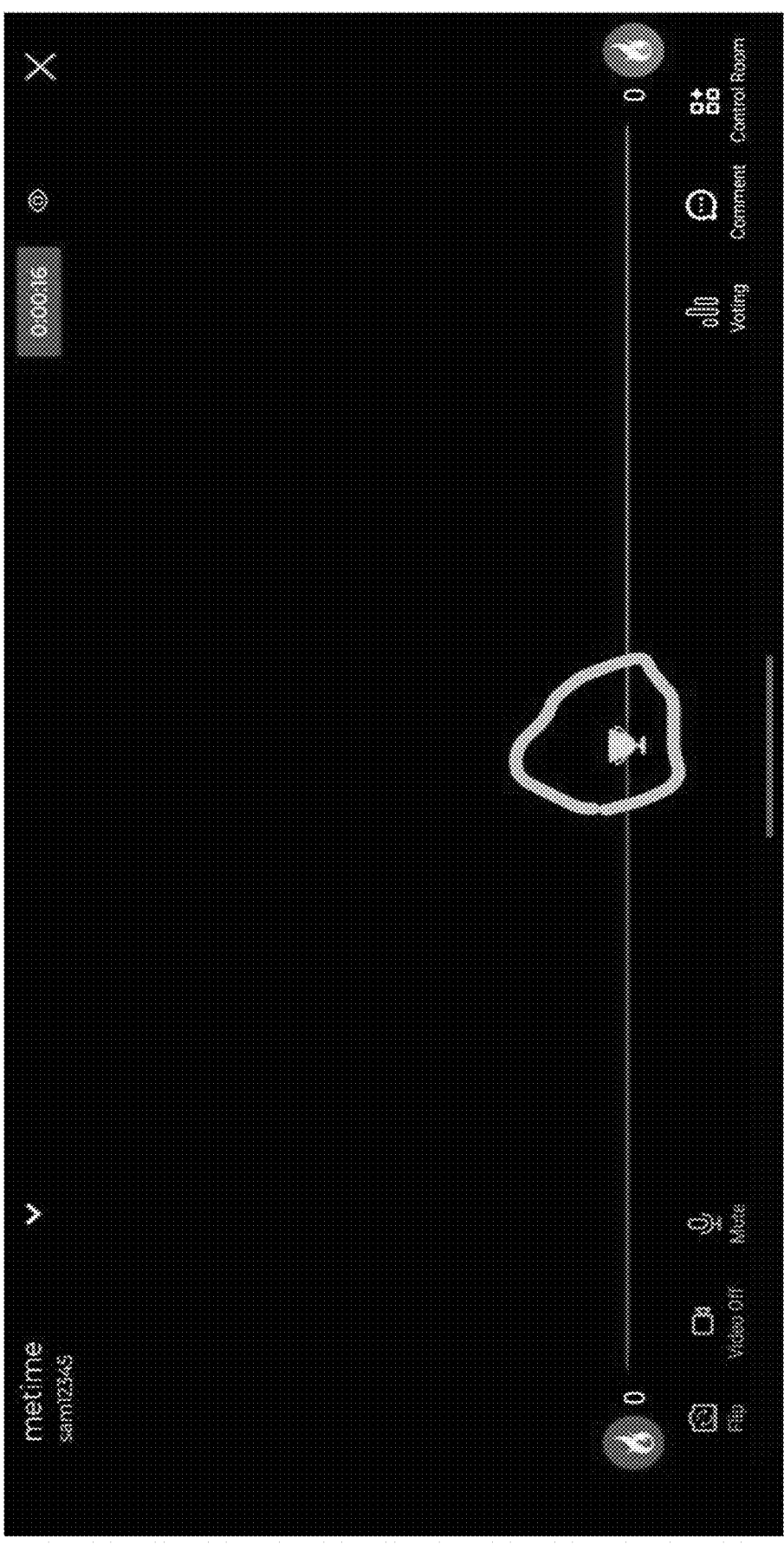
FIG. 14 is a screen shot of a with a trophy showing the participant with the most votes.

This method is used for animation when an audience member successfully votes for any participant(s). The animation may be a trophy (see FIG. 14) in the center or anywhere else on the screen, such as on the right side or the left side. The trophy is moved to the side of the participant with the most votes. This is done with firebase firestore. The firestore is the Firebase's newest database for mobile app development. Of course, any indicator other than a trophy may be used to indicate the participant with the most votes.

—invitationPopup( )—

This method is used when the host invites a potential participant to join as a participant and enables the participant to be capable of sharing the screen. This method uses the functions of the webRTC.

*deleteInvite( )—

This method is used when a potential member rejects h invitation from the host.

—goingLivewithParticipant( )—

This method is used when the potential members accept the invitation from the host and shares the screen as a participant with the host. This method uses the functions of webRTC so that the participants can share their video and audio as described above.

—getClickonImageDown( )—

This method is used when the host want to see the list of participants and co-hosts.

—sendvote_blue( )—

This method is used when the audience members vote for their favorite participant. This method works with the firebase firestore to store the data in the database.

—getTotalbluevotesFromFireStore( )—

This method is used for tallying the total number of votes for one of the participants that is already stored in the firestore.

—getTotalpinkvotesFromFireStore( )—

This method is used for tallying the total number of votes for another participant that is stored already in the firestore.

i getClickOnCancelLive( )—

This method is used when host stops the broadcasting and ends the event.], using the functionalities of webRTC.

ii startBroadcast( )—

This method is used when the host starts the broadcasting the event. it uses the functions of webRTC.

onJoinChannelSuccess( )—

This method is used when the audience members and the participants join the event, and uses the functions of webRTC.

onRtcStats( )—

This method uses the IRtcEngineEventHandler for the video and audio bitrates.

onMuteAudioClicked( )—

This method is used when the participants and host want to mute the audio provided by the functions by webRTC.

onMuteVideoClicked( )—

This method is used when the participants and host want to mute the video provided by the functions by webRTC.

checkLiveUser( )—

This method is used to get the number of audience members who are live at the moment from the firebase.
getAudienceVoteDesign( )—

This method is used to provide the designs of voting from the firebase. This method accomplished through the graphical user interface (GUI).

A full screen horizontal view is not a requirement, but gives the audience members the best experience to watch live streamed videos and also access the largest number of options to send feedback and insights with features like emoticons and comment.

The high-streaming video platform has a user-friendly User Interface so that anybody can enjoy the streaming without much hassle and also the portability in a synchronized interface for both the participants and the host (broadcaster) are kept in mind while developing MeLive.

Figure 2:
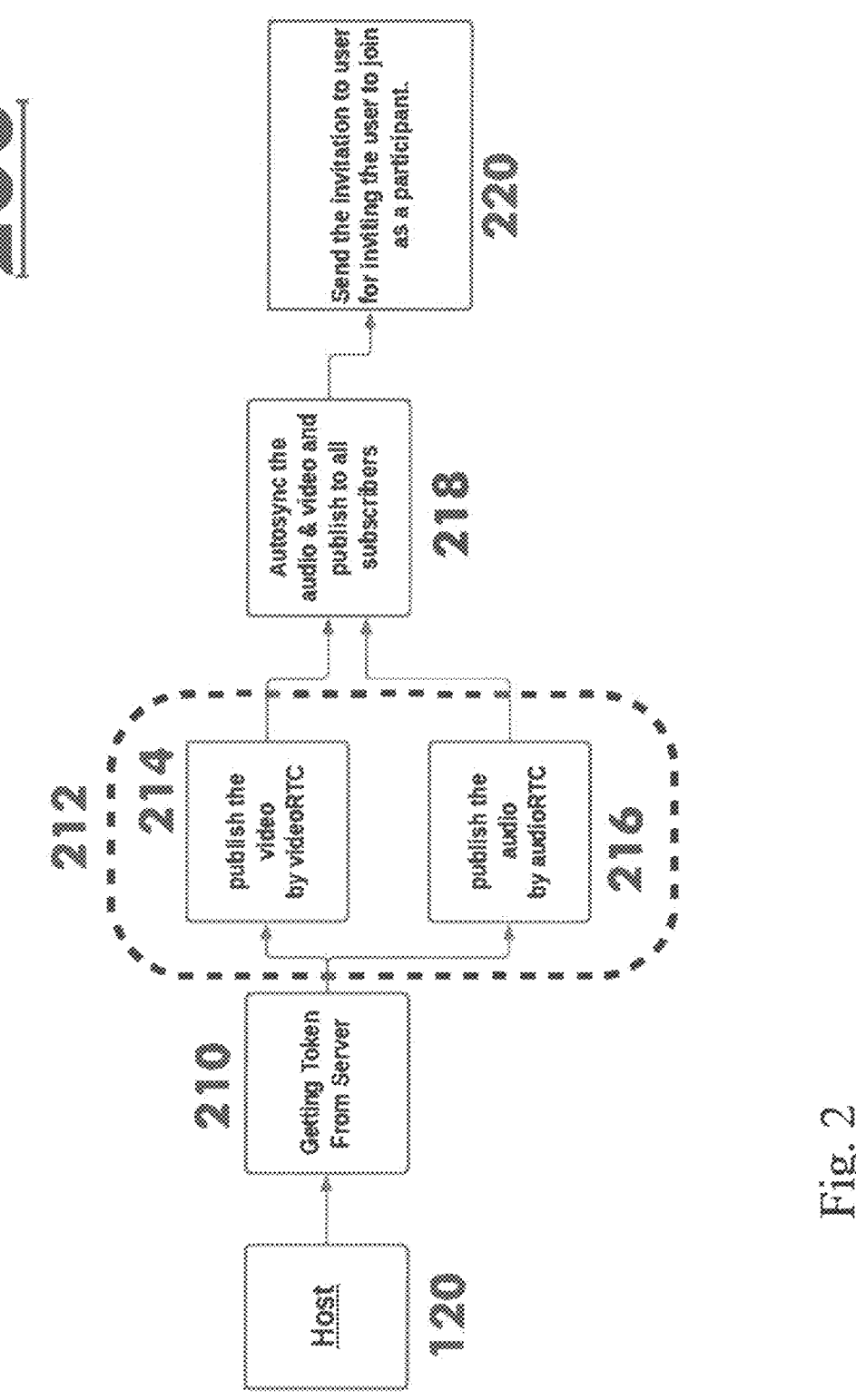
FIG. 2 shows a block diagram of a step-by-step process of a host.

FIG. 2 shows a block diagram of a step-by-step process 200 of a host 120 according to an embodiment of the present invention.

In step 210, the host 120 gets a particular token from the MeTime server for a particular channel.

After getting the token from the server 120, the host creates a channel in step 212 which enables users to join the event as participants.

In step 214, the host 120 publishes their video by using videoRTC. In step 216, the host publishes their audio by using audioRTC, In step 218, the audio and video are autosynched, and the synched audio and video are made published (made visible) to the potential participants.

In step 220, the host 120 sends an invitation to the potential participants that are in the control room to join as a participant, and the participants are added to the waiting room.

Figure 3:
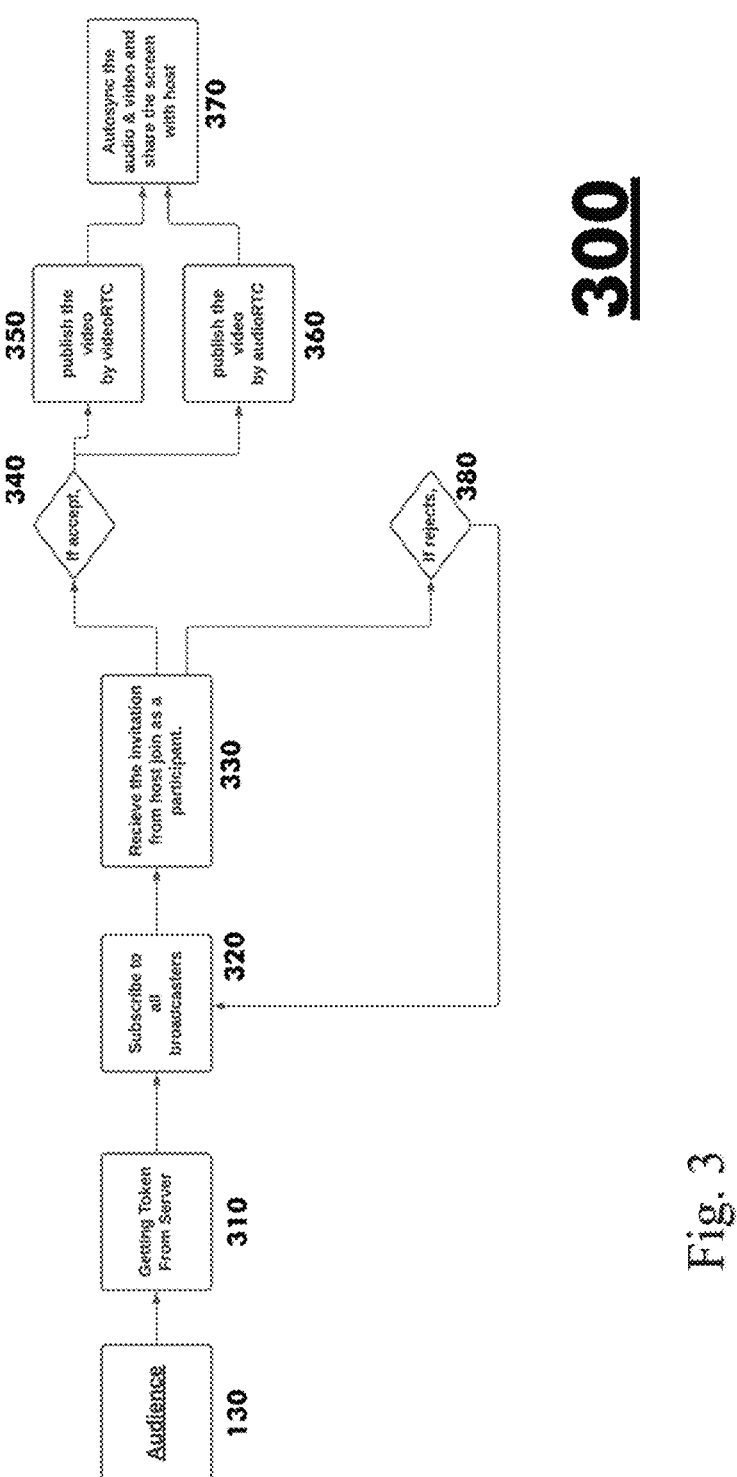
FIG. 3 is a diagram showing a step-by-step process of an audience member relative to the host and the participants.

FIG. 3 is a diagram showing a step-by-step process 300 of an audience member 330 relative to the host 120 and the participants 150.

In step 310, the audience member 140 receives the particular token gotten by the host 120. The audience member 140 joins the channel that was created by the host 120.

In step 320, after joining in the channel, the audience member 140 is able to subscribe the audio and video to the host and participants who broadcast their video and audio.

In step 330, the audience member 140 receives an invitation from the host 120 if the audience member is selected to be a potential participant, and the host 120 adds the potential participant to the control room. It seems like the potential participants are invited before the audience members. In step 340, if the potential participant accepts the invitation, the potential participant joins the channel as a participant 150. Then, the participant's video is published in step 350 to all of the audience members 140 by videoRTC and the participant's audio is published in step 360 to all of the audience members 130 by audioRTC.

In step 370, after steps 350 and 360, the audio and video of the participant are autosynched and shared on the screen with the host 120 and the audience members 130.

Contrarily, if the potential participant 140 rejects the invitation, in step 380, the potential participant 140 continues in the channel as an audience member 130 only.

Figures 4A, 4B, 4C:
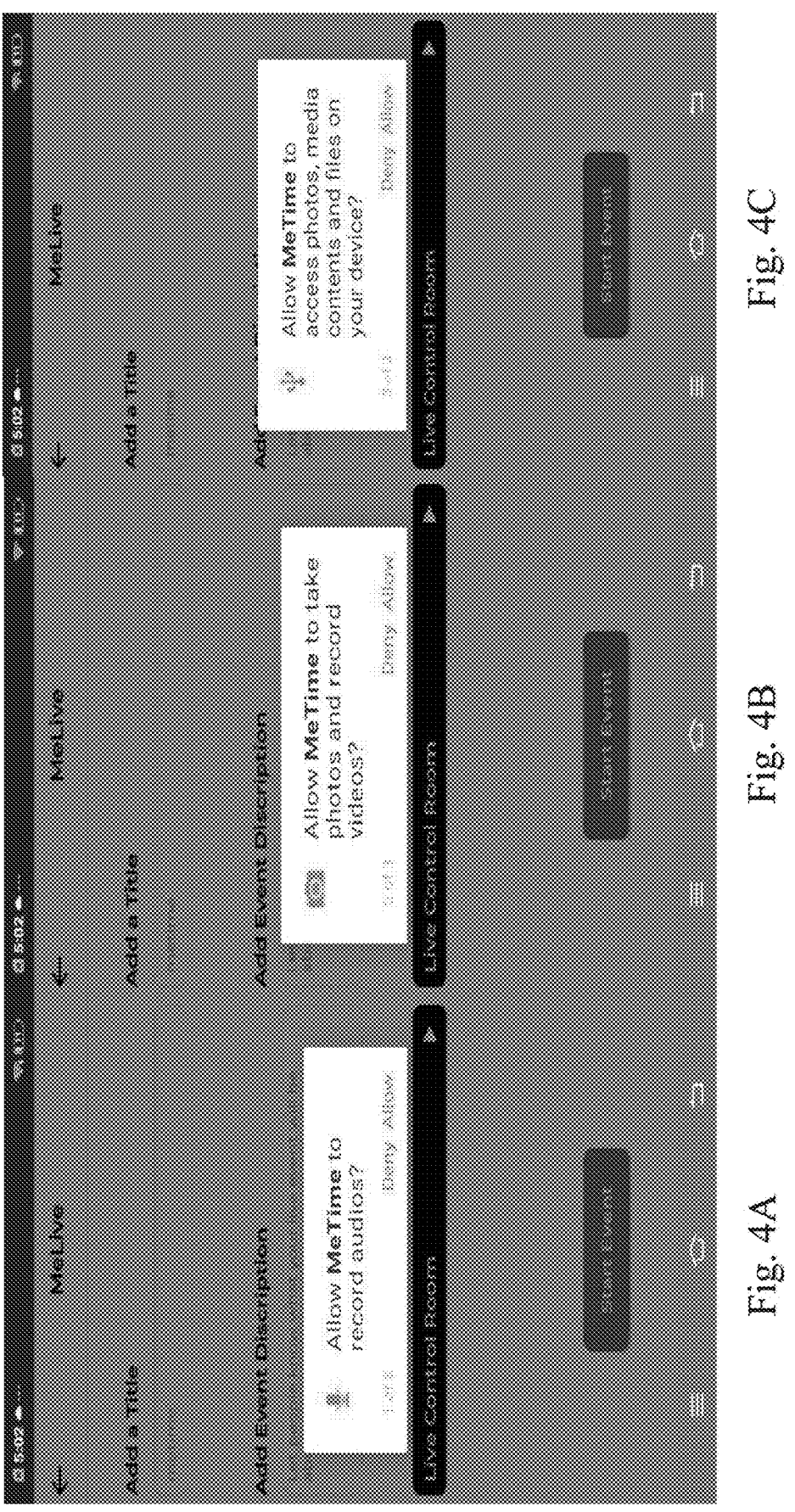
FIGS. 4A-4C are pages 1-3 of a screenshot when a host creates an event, and then gets permission for using the audio and video by accessing storage.

FIGS. 4A-4C are pages 1-3 of a screenshot when a host creates an event, and then gets permission for using the audio and video by accessing storage.

Figure 5:
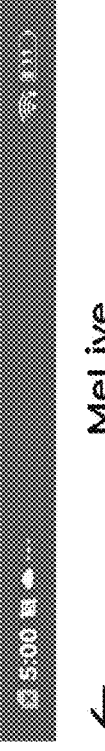
FIG. 5 is a screenshot showing a first screen of an app/software (hereinafter collectively called an app) when the host creates a channel and an interface of entering a channel name, event name/password and LiveControlRoom (name given for a control room). The previous figures show diagram and permission screens.

FIG. 5 is a screenshot showing a first screen of an app/software (hereinafter collectively called an app) when the host creates a channel and an interface of entering a channel name, event name/password and a LiveControlRoom. The previous figures show diagram and permission screens.

FIG. 6 is an interface of the LiveControlRoom that is shown in the screenshot of FIG. 5. Here, host 120 can add a co-host and participants before starting an event. This interface is for the use of only the host.

Figure 7:
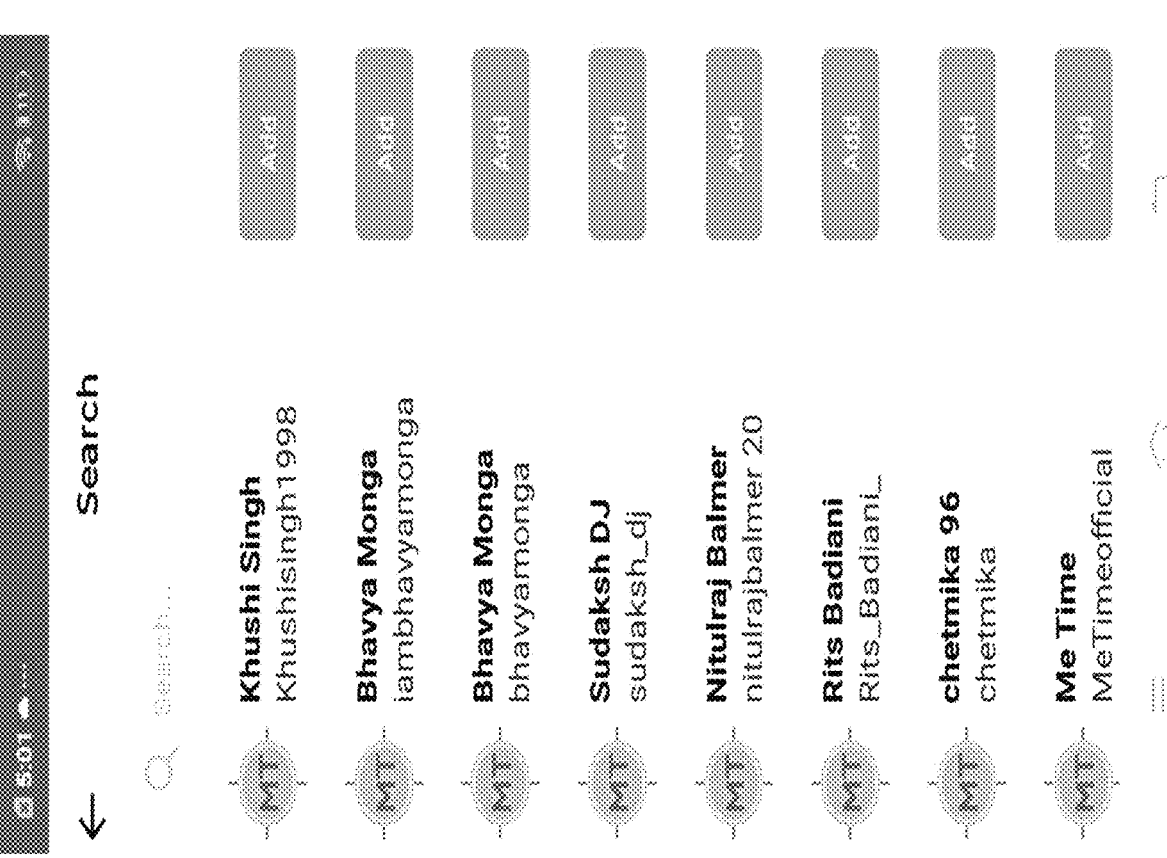
FIG. 7 is a screenshot describing the interface when the host clicks on a search button as shown in FIG. 6 to add audience members as potential participants.

FIG. 7 is a screenshot describing the interface when the host clicks on the search button as shown in FIG. 6 to add potential participants.

Figure 8:
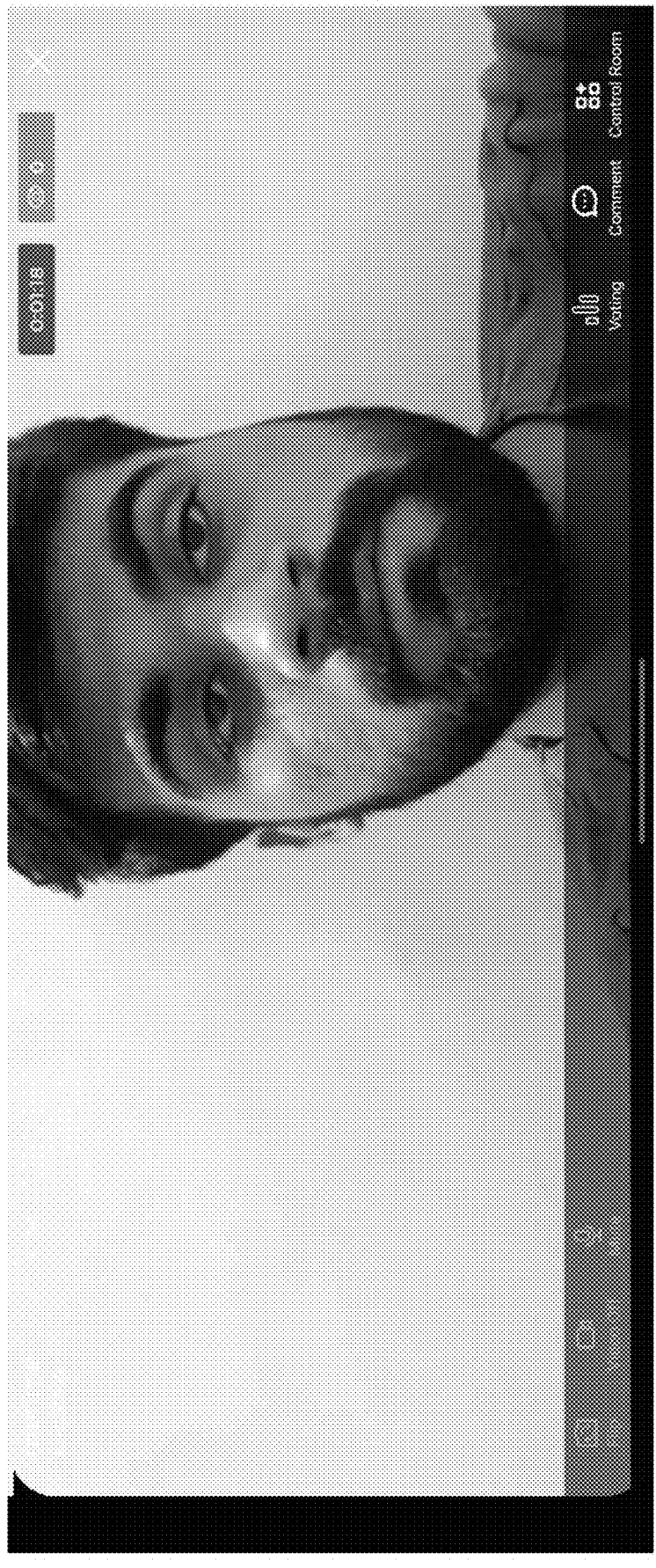
FIG. 8 is a screenshot of the screen of the host showing different functions at the bottom of the screen provided to the host. On the top right, there are timings. There are also views of the audience members, as well as participants who are connected in the channel.

FIG. 8 is a screenshot of the screen of the host. There are different functions provided to the host at the bottom of the screen. On the top right, there are timings. There are also views of the audience members and participants who are connected in the channel with the event.

Figure 9:
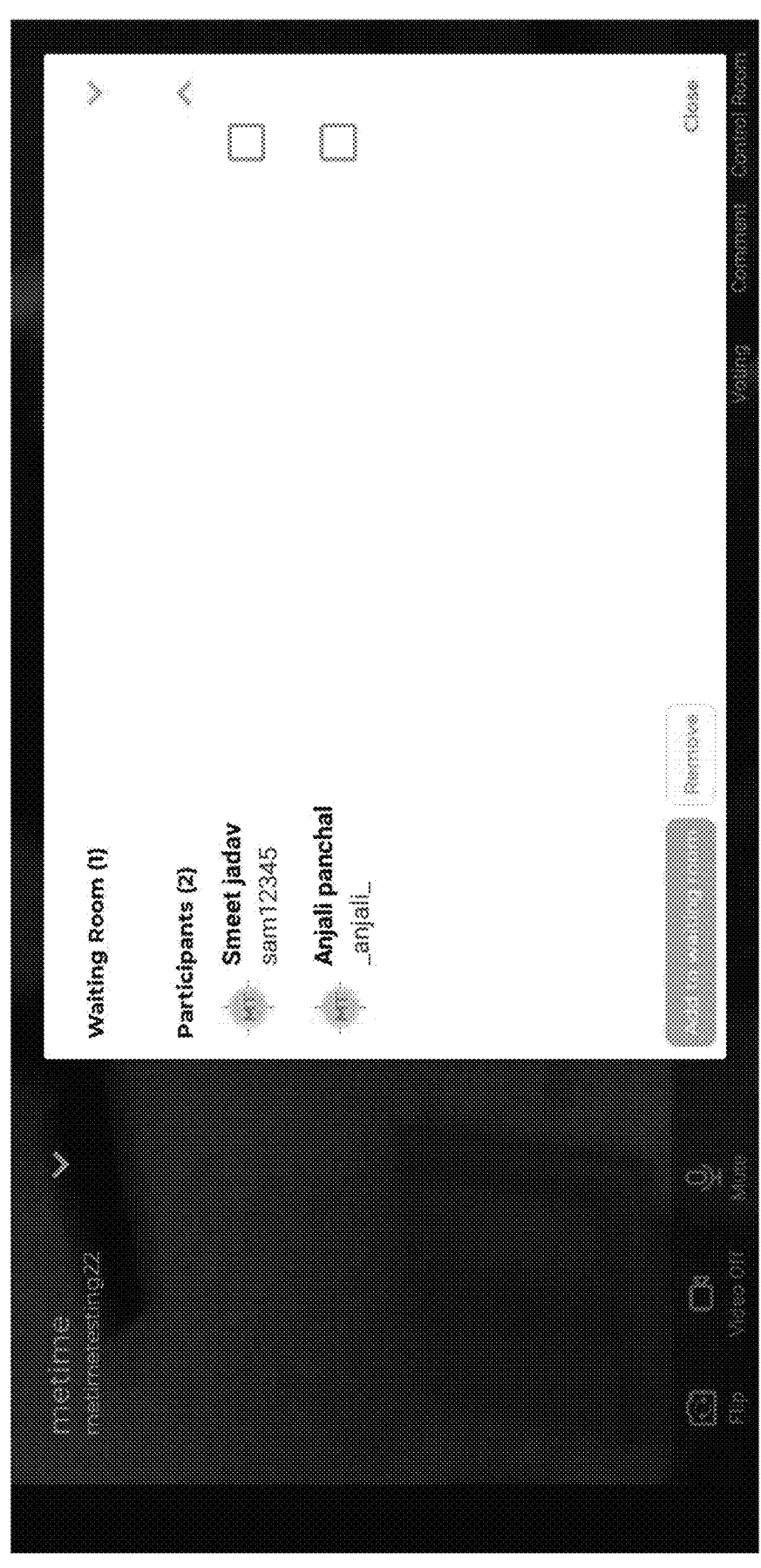
FIG. 9 is an interface of the LiveControlRoom. When the host presses the control room as is shown in FIG. 8, from the participant list, the host can add participants to the waiting room.

FIG. 9 is an interface of the control room. When the host presses the control room as is shown in FIG. 8, from the participant list, the host can add participants to the waiting room. The host can also remove the participants from the control room. This interface is only shown to the host and thus is controlled only by the host.

Figure 10:
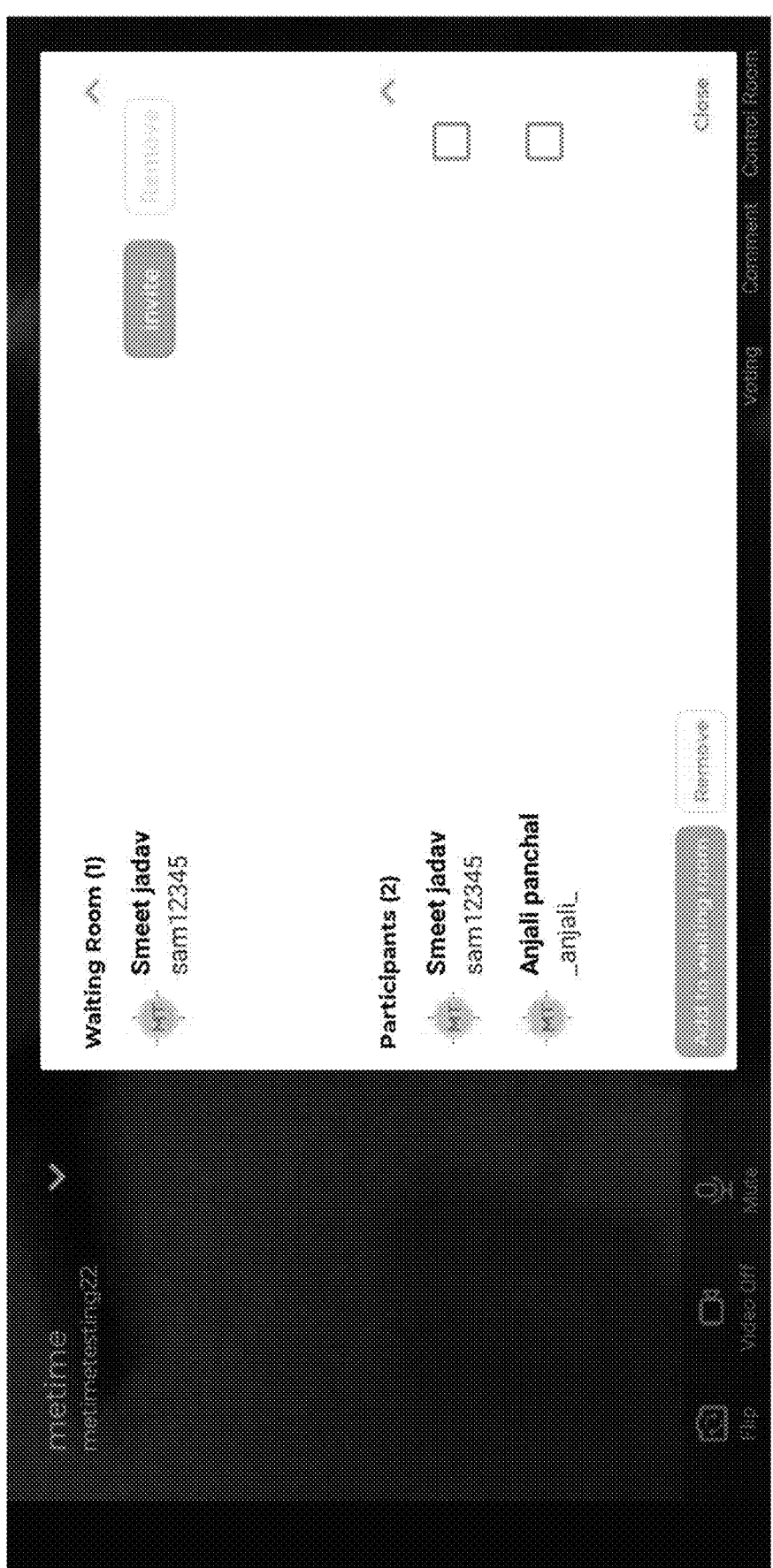
FIG. 10 is a screenshot when the host adds the participants to the waiting room.

FIG. 10 is a screenshot when the host adds the participants to the waiting room.

Figure 11:
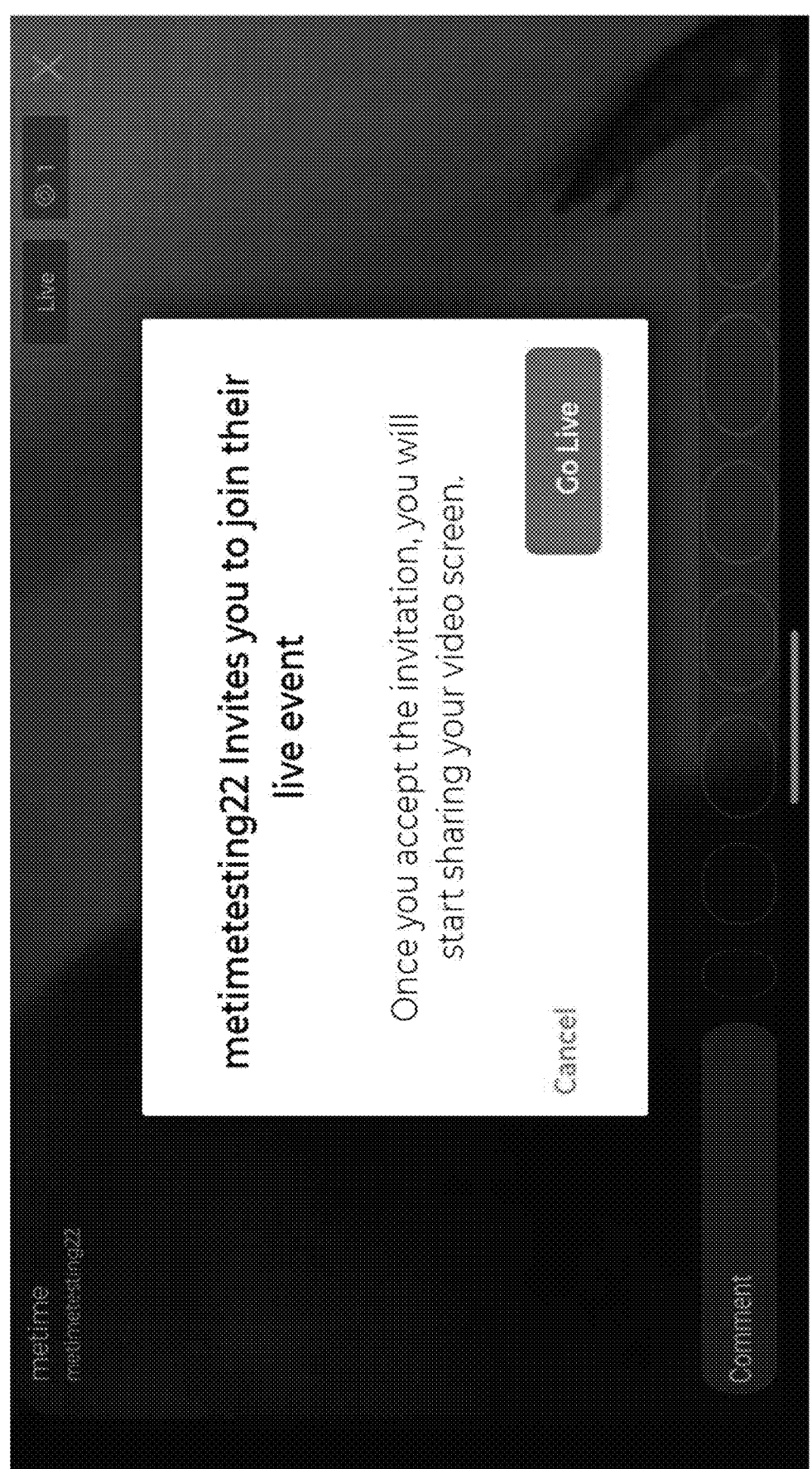
FIG. 11 is a screenshot of a screen of the device of the participant when the host sends the invitation to the participant.

FIG. 11 is a screenshot of a screen of the device of the participant when the host sends the invitation to the participant. The participant can join the event by clicking on the Go Live button.

Figure 12:
FIG. 12 is a screenshot of the host screen when there is one participant sharing the screen with the host.

FIG. 12 is a screenshot of the host screen when there is one participant sharing the screen with the host.

Figure 13:
FIG. 13 is a screenshot of the host screen when there are two participants sharing the screen with the host. In this instance, the host in the center of the screen.

FIG. 13 is a screenshot of the host screen when there are two participants sharing the screen with the host. In this instance, the host in the center of the screen. Of course, the host can be placed in other sections of the screen, such as the right side, the left side, or in a window somewhere on the screen.

One example of an event assumes that there are 10 participants. Then, 5 participants will be on team A and 5 participants will be in team B. The 1st performance will be between participant 1A and 2A. Participant 1A will perform first, say for 3 min and after his/her performance, participant 2A will performance, say for 3 min, After participant 2A performance has completed or during his/her performance itself, the audience members will vote for either participant 1A or 2A. After the first 1A and 2A performances are done, the host will invite participants 1B and 2B, and so on.

The app is developed totally on WebRTC(Real-Time Communication). To integrate the WebRTC with the app, a particular App id and a token generated by the server 120 are needed for synchronizing the view of Broadcaster and Audience.

One can either create a channel to broadcast (host—organizers in this case) or join the channel to watch the broadcast (audience) or when invited by the host one can join as a participant (same as host with limited control features).

Creating a channel will set the client role in WebRTC as host, with features available like camera controls, namely, camera flip, video on/off, and audio mute/unmute. Also, the host is given the functions of control over adding or removing a participant, creating a comment section, and launching a voting poll.

WebRTC publishes video by VideoRTC and audio by audioRTC, which both then get auto-synched and finally broadcasted.

The host can invite multiple potential participants to join the live broadcast, and this sets the client role in WebRTC as participant. The potential participants who accept the invitation will be given the role of participant and will be able to share a screen with the host where they would have auto-sync video and audio. Potential participants who reject the invitation will be returned to the role of audience member.

Joining the channel will set the client role in WebRTC as audience, with the only features available being viewing the performances, comment on the performances, real-time voting, and leaving the live broadcast.

An image of the MeLive button would appear on the home page screen for the audience members to show the audience members that someone has started the broadcasting, and so they can join the channel to view the competitions and give insights via comments in comments section and via real-time voting.

Some relevant features according to aspects of the present invention relate to the following.

The host can exit the screen and comeback whenever they want. The host can invite and remove any participant at any time.

Virtual rooms are created for participants to enter the competition.

The host can initiate the participant in the waiting room, and can control the screen size with respect to an aspect ratio of participant on the screen.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of allowing a host to broadcast an on-line event, comprising:

enabling the host to provide an invitation to potential participants to participate in the on-line event;

having the host in a control room where the host is able to select the potential participants, other than the host, before creating the on-line event;

enabling the potential participants to accept the invitation to be participants;

having the host receive a token from a server for a channel, and after getting the token, creating the on-line event by creating the channel, which enables audience members to receive the token to join the online event:

accepting the audience members to sign up for the on-line event;

controlling, by the host, access by the participants to be viewed by the audience members; and enabling voting in real-time by the audience members from among the participants;

wherein the method includes real time live streaming of the channel for the on-line event with low memory consumption, wherein a device which each host, each participant and each audience member uses to join the channel for the on-line event automatically ends a performance of the event on the device and frees up storage on the device by deleting files associated with the event, including video files associated with the event, using a garbage collection functionality of the respective device.

2. The method according to claim 1, further comprising:

enabling the host and the participants to produce audio by audio RTC and video by videoRTC;

synchronizing the audio and the video; and publishing the synchronized audio and video to be viewable by the host, the audience members and the participants on top of the channel.

3. The method according to claim 2, further comprising:

enabling the host to turn on/off the publishing ability of the participant.

4. The method according to claim 2, wherein the host and at least one of the participants are displayed according to control by the host, and the host sets the order of the participants to allow the publishing of the audio and video to the audience members.

5. The method according to claim 1, further comprising:

acquiring, via the host, the token from the server for the channel;

creating, by the host, the channel through webRT, which enables the audience members to join the on-line event;

acquiring, by the audience member, the token; and joining, by the audience member, the channel created by the host using the token.

6. The method according to claim 1, wherein the enabling of the voting comprises:

having the host making a voting poll available; and recording store votes by the audience members for each participant in a database, and updating the votes in real-time.

7. The method according to claim 1, further comprising: displaying an indication of the participant acquiring the most votes from the audience members.

8. The method according to claim 1, wherein the host controls how many participants are simultaneously displayed and/or an aspect ratio of the participants.

9. A system for enabling a host to broadcast an on-line event, comprising:

a server comprising:

a memory configured to store computer executable instruction; and a processor for controlling the execution of the computer-controlled executable instructions stored in the memory and configured to:

enable a host to provide an invitation to potential participants to participate in the on-line event;

enable the host in a control room where the host is able to select the potential participants, other than the host, before creating the on-line event;

enable the host to receive a token from the server for a channel, and after getting the token, create the on-line event by creating the channel, which enables audience members to receive the token to join the on-line event:

enable the potential participants to accept the invitation to be participants; accept audience members to sign up for the on-line event;

control, by the host, access by the participants to be viewed by the audience members; and enable voting in real-time by the audience members from among the participants;

wherein the system performs real time live streaming of the channel for the on-line event with low memory consumption, wherein a device which each host, each participant and each audience member uses to join the channel for the on-line event automatically ends a performance of the event on the device and frees up storage on the device by deleting files associated with the event, including video files associated with the event, using a garbage collection functionality of the respective device.

10. The system according to claim 9, wherein the processor is further configured to:

enable the host and the participants to produce audio by audio RTC and videoRTC;

synchronize the audio and the video; and publish the synchronized audio and video to be viewable by the host, the audience members and the participants on top of the channel.

11. The system according to claim 10, wherein the processor is further configured to:

enable the host to turn on/off the publishing ability of the participant.

12. The system according to claim 10, wherein the processor is further configured to: enable displaying the host and at least one of the participants on displays of the host, the audience members and the participants according to control by the host, and the host sets the order of the participants to allow the publishing of the audio and video to the audience members.

13. The system according to claim 9, wherein the processor is further configured to:

acquire, via the host, the token from the server for the channel;

create, by the host, the channel through webRTC, which enables the audience members to join the on-line event;

acquire, by the audience member, the token; and enable joining, by the audience member, the channel created by the host using the token.

14. The system according to claim 9, wherein the processor is further configured to:

add the potential participant to a control room along with the host, by the host;

wait for acceptance of the invitation by the potential participant in the control room to be one of the participants; and enable joining, by the potential participant, the channel as a participant, if the potential participant accepts the invitation, and placing the participant in a waiting room;

remove the potential participant from the control room, and converting the potential participant to one of the audience members in response to the potential participant rejecting the invitation.

15. The system according to claim 9, wherein the processor is further configured to: enable of the voting by:

having the host making a voting poll available; and recording store votes by the audience members for each participant in a database, and updating the votes in real-time.

16. The system according to claim 9, wherein the processor is further configured to: enable displaying on displays of the host, the audience members and the participants of an indication of the participant acquiring the most votes from the audience members.

17. The system according to claim 9, wherein the processor is further configured to: enable the host to control how many participants are simultaneously displayed and/or an aspect ratio of the participants.

* * * * *